Patented Feb. 15, 1944

2,341,994

UNITED STATES PATENT OFFICE 2,341,994

CALCIUM SULPHATE PIGMENT AND METHOD FOR PREPARING THE SAME

Franklin L. Kingsbury, Rumson, and Frank J. Schultz, Fords, N. J., assignors to National Lead Company, New York, N. Y., a corporation of New Jersey No Drawing. Application March 15, 1941, Serial No. 383,548

8 Claims. (Cl. 106—306)

The present invention relates to calcium sulphate pigments and to methods for controlling the bodying properties thereof. The expression "calcium sulphate pigments" as used herein means and includes not only pigmentary calcium sulphate but also composite pigments containing calcium sulphate, for instance, composite titanium dioxide-calcium sulphate pigment.

The bodying properties of a pigment may be defined as the tendency of a pigment to influence the consistency of film-forming surface coating compositions. This property of a pigment, particularly calcium sulphate pigments, such as titanium dioxide-calcium sulphate pigment, is usually developed through the use of so-called "bodying agents" which are added to pigmented film-forming compositions particularly flat wall paints for the purpose of increasing the consistency of the composition. Bodying agents most commonly used are water and soap solutions. The extent of bodying, i. e. increase in consistency, developed by the bodying agent will vary depending upon the nature of the pigment portion of the film-forming material, and it has been found in connection with titanium dioxide-calcium sulphate pigments that different batches although containing the same relative proportions of titanium dioxide and calcium sulphate give different bodying effects when incorporated in film-forming vehicles to which a bodying agent is added.

It will be appreciated that the control of the bodying properties of calcium sulphate pigments presented a problem of considerable importance to the industry. The present invention provides a simple and effective solution of that problem.

A proper understanding of the invention necessitates a brief consideration of what is meant by the term "consistency" as applied to a film-forming composition, e. g., a paint, and the method of determining it. The consistency of, for instance, a paint has been defined as its resistance to deformation or flow which resistance may be due to viscosity or to plasticity. The method of determining consistency which was employed to obtain the results hereinafter reported was as follows:

An instrument sometimes called a "consistometer" or "mobilometer" was employed. This instrument consists of a base plate provided with adjustable screw legs for leveling the instrument, a tall cylinder supported by the base plate for receiving the paint to be tested, a plunger having a perforated disc at one end and a weight pan at the other, and a guide bracket also supported by the base for guiding the fall of the plunger. The cylinder is provided with a mark on its inner surfaces to fix the level to which it is to be filled with paint. The plunger rod has two marks 5 cm. apart which determine the distance of the plunger's fall through the paint. The disc is perforated with 25 holes about $\frac{1}{16}$ inch in diameter.

The procedure for testing the pigment involved weighing 120 grams of the pigment into a porcelain enamel cup. A sufficient amount of film-forming vehicle was added to form a paste suitable for grinding when the pigment-vehicle mixture is worked together. The paste was weighed in order to ascertain the weight of vehicle used. It was then run once through a three-roll laboratory mill and after this treatment cut down with additional vehicle so that the paint contains 56 per cent pigment and 44 per cent vehicle. (The vehicle was a processed tung-linseed oil mixture containing 30 per cent of volatile thinner). 100 grams of the paint so prepared were weighed into a suitable vessel and 0.5 cc. of a 2.0 per cent cobalt naphthenate drier added thereto.

The bodying of a paint prepared as above described was effected by adding to the 100 gram sample 1.5 cc. of a soap solution after the drier had been incorporated. The soap solution was mixed in by stirring, for instance, using a low speed forked stirrer turning at 750 R. P. M., for exactly 6 minutes. After stirring, the paint was allowed to stand to permit the escape of entrapped air and to allow the body to develop which requires a minimum of one-half hour. (The soap solution was prepared by dissolving 1 part by weight of a neutral soap, e. g. Ivory soap flakes, in 99 parts of distilled water and adding thereto 150 parts by weight of ethyl alcohol.) In determining the bodying characteristics of a pigment, determinations were made both on the paint containing no soap solution as well as on the paint so treated.

In carrying out the test in the mobilometer the paint was poured into the cylinder up to the inner mark. The plunger was fastened in the guide bracket while holding it above the level of the paint. The weighting pan and sufficient additional weight so that the weight of the plunger plus pan plus added weight equals a predetermined value was placed on the plunger and the perforated disc immersed in the paint to a depth so that the lower mark on the stem of the plunger was just visible above the collar of the guide bracket. The plunger was held in this position for exactly 30 seconds. The plunger was then allowed to fall through the paint, the time required for the upper mark on the plunger stem to reach the collar of the guide bracket being taken by a stop watch. (The weight of the plunger plus pan plus added weight for testing paints containing no bodying agent was 20 grams; that for bodied paints 40 grams or, if necessary, because of the heavy body 75 grams or even 125 grams.)

The above test was carried out at 70° F. ± 2° F. and a relative humidity of 50%.

The results obtained were expressed as gram-seconds which is the product of multiplying the weight of the plunger plus pan plus added weight by the time in seconds required for the plunger to fall the distance between the two marks, i. e., 5 cm. (For a complete discussion of consistency of paints and methods and apparatus for evaluating consistency the reader is referred to chapter 17, page 561 et seq. "Physical and Chemical Examination of Paints, Varnishes, Lacquers and Colors" by Dr. Henry A. Gardner, eighth edition, 1937, distributed by the Institute of Paint and Varnish Research, Washington, D. C.)

From the foregoing it will be appreciated that a pigment having undesirable bodying characteristics will exert a detrimental effect on the finished surface coating compositions containing it. Very often it is found that the undesirable bodying characteristic is in the nature of a tendency toward excessive bodying and there is need for some means of lowering the bodying tendency. The consistency of the paint obtained after the addition of the bodying agent, usually water or a soap solution is known as "bodied consistency," that of the untreated paint as "unbodied consistency."

Thus, it is an object of the present invention to provide means for lowering the bodying tendency of calcium sulphate pigments. It is another object of the present invention to provide means for treating pigmentary calcium sulphate and composite titanium dioxide-calcium sulphate pigments so that paints may be prepared from such treated pigments possessing any predetermined consistency. These and other objects of the invention will become apparent from the present description.

In its broadest aspect the invention contemplates determining the bodying tendency of a calcium sulphate pigment by testing a sample of the pigment and if it be desired to lower the bodying tendency to admix with the pigment a small amount of an organic aliphatic amine.

Thus, according to the invention, it has been found that the addition of small amounts of ethylene amines, such as ethylene diamine, $NH_2.CH_2.CH_2.NH_2$ diethylene triamine, $NH_2.CH_2.CH_2.NH.CH_2.CH_2.NH_2$ triethylene tetramine, $NH_2.CH_2.CH_2.NH.CH_2.CH_2.NH.CH_2.CH_2.NH_2$ etc., as well as aliphatic alcohol amines, such as isopropanol amine, $CH_2.CHOH.CH.NH_2$, triethanolamine, $N(C_2H_4OH)_3$, etc., will lower the bodying tendency of calcium sulphate pigments.

The amount of amino-compound to be admixed with the calcium sulphate pigment will vary depending upon the amount of lowering in bodying tendency desired. Amounts between about 0.05 per cent and about 2.0% cover for all practical purposes the two extremes. Ordinarily, amounts of treating agent ranging from about 0.1 per cent to about 1.0 per cent are effective, a preferred range being from about 0.1 per cent to about 0.5 per cent, calculated on the weight of the pigment.

The amino-compound may be admixed with pigment particles in any convenient manner. If the amine is a solid it may be incorporated with the dry finished pigment by intimate mixing means. If the amine is a liquid, or if a solution of solid amine is employed, it may be sprayed upon the dry pigment and, if necessary, the solvent may be removed by evaporation. If the amine is to be added to a pigment which in the course of manufacture is subjected to a milling treatment, either wet or dry milling or both, the addition may be made prior to, during, or after such milling treatment. If the pigment requires a calcination treatment the amine should always be added after such treatment. In short, the method of incorporation is not in itself of particular importance provided an intimate association of amino-compound and pigment particles is achieved.

Having generally described the invention, the following examples will more specifically illustrate it:

EXAMPLE I

An unmilled composite titanium dioxide-calcium sulphate pigment, consisting of 30 per cent $TiO_2$ and 70 per cent $CaSO_4$ was sprayed with an aqueous solution of triethylene tetramine, $NH_2(CH_2.CH_2.NH)_2CH_2.CH_2.NH_2$ and then tumbled and dried at 120° C. to 150° C. to evaporate the water. The amount of treating agent added was calculated to be 0.26 per cent based on the weight of the pigment. The treated and dried product was then pulverized in a Raymond mill, air separated and then passed through a hammer mill to further insure an even distribution of the amine.

This pigment treated according to our novel process was superior to a similarly milled and disintegrated untreated pigment in respect to mixing, dispersibility, viscosity, drying, color stability and gloss when incorporated into organic coating vehicles.

When the coating compositions prepared with the treated and the untreated composite pigment were bodied by the addition of a small amount of water it was found that our novel water sensitivity reducing treatment had lowered the consistency of the paint about 50 per cent, as shown by the results obtained from tests carried out in the modified Gardner mobilometer referred to above.

EXAMPLE II

To a dry milled composite titanium dioxide-calcium sulphate pigment obtained by co-precipitation, 30 per cent $TiO_2$-70 per cent $CaSO_4$, was added at a uniform rate in a screw conveyor as the pigment was being fed to a hammer mill, 0.2 per cent diethylene triamine, $NH_2.CH_2.CH_2.NH.CH_2.CH_2.NH_2$ based on the weight of the dry pigment.

The properties of the treated pigment, as compared to a similarly milled and disintegrated but otherwise untreated pigment, were greatly improved in regard to viscosity, dispersibility, drying, color stability, gloss and gloss retention when incorporated into organic coating vehicles.

When a small amount of bodying agent (water) was added to a flat wall paint formulated with treated and untreated pigment, it was found that, because of reduced water sensitivity brought about by our novel treatment, the viscosity or consistency of the paint was reduced about 70 per cent.

After long storage in cans it was found that the untreated pigment had settled out to a hard cake which could be redispersed in the vehicle only with great difficulty. The paint prepared with the amino-treated pigment, however, had settled to a soft, easily redispersible cake.

EXAMPLE III

A composite titanium dioxide-calcium sulphate pigment, 30 per cent $TiO_2$-70 per cent $CaSO_4$, obtained by wet mixing prior to recalcination, was milled in an edge runner mill with 0.4 per cent tetraethylene pentamine,

based on the weight of the pigment followed by disintegration in a hammer mill.

The same pigment similarly milled and disintegrated, but not treated according to our process, was compared as to pigment properties with the treated pigment. It was found that as in Experiments Nos. I and II the treated pigment, when incorporated into coating composition vehicles, was superior to the untreated in respect to consistency, dispersibility, drying, color stability and gloss characteristics.

When a small amount of bodying agent (water) was added to flat wall paints formulated with the untreated pigment and with pigment treated with tetraethylene pentamine according to this example, it was found that the viscosity as determined in the modified Gardner mobilometer was reduced about 70 per cent. The amine treated pigment also showed superior settling characteristics on long storage of paints formulated therewith.

EXAMPLE IV

A calcium sulphate, prepared by running a lime slurry into excess concentrated sulphuric acid followed by steaming until the hydrated portion of the calcium sulphate was completely converted to the anhydrous form, was deliquored, washed and dried and then calcined at about 700° C.

This calcium sulphate anhydrite was mixed with unmilled $TiO_2$ in the proportion 30 parts $TiO_2$ to 70 parts $CaSO_4$ and then mixed with 0.5% of mixed isopropanolamines, then milled in an edge runner mill and passed through a hammer mill. The same mixture without the amine treatment was similarly milled and disintegrated.

The treated and the untreated pigments were then used in the formulation of flat wall paints whereto, for the purpose of increasing the consistency a small amount of bodying agent, water, was added.

It was found that the paint formulated with the untreated pigment became so viscous that it could not be applied with the brush. The paint formulated with the amine treated pigment according to our process however developed a desirable consistency. Other properties such as dispersibility, drying, color stability of the dried film and gloss characteristics, as well as settling characteristics also were superior in case of the treated pigment.

EXAMPLE V

Calcium sulphate anhydrite, prepared and calcined as described under Experiment IV above, was milled in an edge runner mill with 0.3 per cent diethylaminoethanol, $(C_2H_5)_2$:$N.C_2H_4.OH$, followed by disintegration in a hammer mill.

The milled, treated and disintegrated calcium sulphate anhydrite, when used as an extender in organic coating vehicles, and particularly when incorporated in flat wall paints bodied with a small amount of water produced coating compositions, which were markedly superior to similar coating compositions formulated with untreated calcium sulphate extender, in respect to consistency, dispersibility, workability, drying and color stability of the dried film, as well as settling characteristics on storage in containers.

The amine treatment also produced in the coating compositions, excluding the flat wall paints, an improved gloss and gloss retention of the dried film.

The following table presents data with respect to the efficiency of certain amino-compounds in lowering the bodying tendency of composite titanium dioxide-calcium sulphate pigment having a bodying tendency determined in the manner above described of 2400.

*Table I*

| Treating agent | Amount | Bodied consistency |
|---|---|---|
| None (control) | | 2,400 |
| Tetraethylene pentamine | 0.40 | 600 |
| Diethylene triamine | 0.19 | 760 |
| Diethylaminoethanol | 0.30 | 1,200 |
| Triethylene tetramine | 0.26 | 1,280 |
| Mixed isopropanol amines | 0.4 | 1,350 |

From the foregoing it will be seen that when calcium sulphate pigments are treated with amino-compounds according to the present invention there results not only a lowering of the bodying tendency but the pigment is also improved in other respects, particularly, as to mixing properties and dispersibility in various vehicles, drying properties, color stability and gloss retention of surface coating compositions containing the pigment.

From this description of the invention it will be seen that by means of the present invention the bodying tendency of calcium sulphate pigment may be controlled as desired. Pigments prepared according to the invention are particularly adapted for use in surface coating compositions, especially flat wall paints for interior finishes. They also are excellently adapted for use in inks, paper, rubber, plastics and similar compositions in which such pigments are incorporated.

We claim:

1. Method for lowering the paint bodying tendency of a calcium sulphate pigment which comprises admixing with a calcium sulphate pigment a small amount of an organic aliphatic amine containing at least 2 nitrogen atoms.

2. Method according to claim 1 wherein the pigment specified is pigmentary calcium sulphate.

3. Method according to claim 1 wherein the pigment specified is composite titanium dioxide-calcium sulphate pigment.

4. Method according to claim 1 wherein the amino-compound specified is an ethylene amine.

5. Method according to claim 1 wherein the amino-compound specified is tetraethylene pentamine.

6. An improved calcium sulphate pigment having reduced paint bodying tendency prepared according to the method of claim 1.

7. Improved pigmentary calcium sulphate having reduced paint bodying tendency prepared according to the method of claim 1.

8. Improved composite titanium dioxide-calcium sulphate having reduced paint bodying tendency pigment prepared according to the method of claim 1.

FRANKLIN L. KINGSBURY.
FRANK J. SCHULTZ.